United States Patent
Olmsted-Thompson

(10) Patent No.: US 11,740,921 B2
(45) Date of Patent: Aug. 29, 2023

(54) COORDINATED CONTAINER SCHEDULING FOR IMPROVED RESOURCE ALLOCATION IN VIRTUAL COMPUTING ENVIRONMENT

(71) Applicant: Google LLC, Mountain View, CA (US)

(72) Inventor: Jeremy Warner Olmsted-Thompson, Seattle, WA (US)

(73) Assignee: Google LLC, Mountain View, CA (US)

( * ) Notice: Subject to any disclaimer, the term of this patent is extended or adjusted under 35 U.S.C. 154(b) by 82 days.

(21) Appl. No.: 17/101,714

(22) Filed: Nov. 23, 2020

(65) Prior Publication Data
US 2022/0164208 A1    May 26, 2022

(51) Int. Cl.
G06F 9/455    (2018.01)
G06F 9/48     (2006.01)
G06F 9/50     (2006.01)

(52) U.S. Cl.
CPC ........ *G06F 9/45558* (2013.01); *G06F 9/4881* (2013.01); *G06F 9/5077* (2013.01); *G06F 2009/45595* (2013.01)

(58) Field of Classification Search
CPC .................................................. G06F 9/45558
USPC .............................................................. 718/1
See application file for complete search history.

(56) References Cited

U.S. PATENT DOCUMENTS

| | | | |
|---|---|---|---|
| 8,359,451 B2* | 1/2013 | Chen ................... | G06F 9/45545 711/170 |
| 8,788,739 B2* | 7/2014 | Chang .................. | G06F 12/023 711/6 |
| 9,250,827 B2* | 2/2016 | Beveridge ............. | G06F 9/4856 |
| 9,501,224 B2* | 11/2016 | Lagar ....................... | G06F 3/065 |
| 9,766,945 B2* | 9/2017 | Gaurav .................. | G06F 9/5016 |
| 9,779,015 B1* | 10/2017 | Oikarinen ............... | G06F 3/067 |
| 9,785,460 B2* | 10/2017 | Zheng ................. | G06F 9/45558 |

(Continued)

FOREIGN PATENT DOCUMENTS

JP    6374845 B2    8/2018

OTHER PUBLICATIONS

International Search Report and Written Opinion for International Application No. PCT/US2021/042287 dated Nov. 5, 2021. 17 pages.

(Continued)

*Primary Examiner* — Mehran Kamran
(74) *Attorney, Agent, or Firm* — Lerner David LLP

(57) ABSTRACT

The technology provides for allocating an available resource in a computing system by bidirectional communication between a hypervisor and a container scheduler in the computing system. The computing system for allocating resources includes one or more processors configured to receive a first scheduling request to initiate a first container on a first virtual machine having a set of resources. A first amount of resources is allocated from the set of resources to the first container on the first virtual machine in response to the first scheduling request. A hypervisor is notified in a host of the first amount of resources allocated to the first container. A second amount of resources from the set of resources is allocated to a second virtual machine in the host. A reduced amount of resources available in the set of resources is determined. A container scheduler is notified by the hypervisor for the reduced amount of resources of the set of resources available on the first virtual machine.

15 Claims, 6 Drawing Sheets

(56) References Cited

U.S. PATENT DOCUMENTS

| | | | |
|---|---|---|---|
| 9,817,756 B1* | 11/2017 | Jorgensen | G06F 11/34 |
| 10,162,658 B2* | 12/2018 | Nicholas | G06F 9/45558 |
| 10,228,983 B2* | 3/2019 | Antony | G06F 9/45558 |
| 10,298,670 B2* | 5/2019 | Ben-Shaul | G06F 3/0635 |
| 10,481,932 B2* | 11/2019 | Sundararaman | G06F 12/0802 |
| 10,761,761 B2* | 9/2020 | Zhuo | G06F 11/1076 |
| RE48,714 E* | 8/2021 | Crouchman | G06F 9/5077 |
| 2012/0324441 A1* | 12/2012 | Gulati | G06F 9/5088 718/1 |
| 2014/0137104 A1* | 5/2014 | Nelson | G06F 9/45558 718/1 |
| 2014/0189684 A1* | 7/2014 | Zaslavsky | G06F 9/45533 718/1 |
| 2016/0099884 A1* | 4/2016 | Boss | G06F 9/5077 709/226 |
| 2016/0124773 A1* | 5/2016 | Gaurav | G06Q 10/04 718/104 |
| 2016/0380905 A1* | 12/2016 | Wang | H04L 41/122 709/226 |
| 2017/0075617 A1* | 3/2017 | Oshins | G06F 9/45558 |
| 2018/0074855 A1* | 3/2018 | Kambatla | G06F 9/505 |
| 2018/0285164 A1* | 10/2018 | Hu | G06F 9/45558 |
| 2019/0026030 A1* | 1/2019 | Yang | G06F 3/0688 |
| 2019/0121660 A1* | 4/2019 | Sato | G06F 9/5088 |
| 2019/0171472 A1* | 6/2019 | Wyble | H04L 67/56 |
| 2020/0174821 A1* | 6/2020 | Iliopoulos | G06F 9/5027 |
| 2020/0264913 A1* | 8/2020 | Rosa, Jr. | G06F 9/45558 |
| 2020/0351650 A1* | 11/2020 | Maria | H04L 9/3239 |
| 2021/0089361 A1* | 3/2021 | Rafey | G06F 9/45558 |
| 2021/0117220 A1* | 4/2021 | Zu | G06F 9/50 |
| 2021/0191751 A1* | 6/2021 | Park | G06F 9/5011 |
| 2021/0248016 A1* | 8/2021 | Freeman | G06F 9/45558 |
| 2021/0342188 A1* | 11/2021 | Novakovic | H04L 67/568 |
| 2021/0349749 A1* | 11/2021 | Guha | H04L 43/0882 |
| 2021/0382632 A1* | 12/2021 | Dontu | H04L 67/1095 |
| 2022/0004431 A1* | 1/2022 | Doudali | G06F 9/45533 |
| 2022/0091900 A1* | 3/2022 | Ito | G06F 9/50 |

OTHER PUBLICATIONS

Chandra et al. Deterministic Container Resource Management in Derivative Clouds. Apr. 17, 2018. 2018 IEEE International Conference on Cloud Engineering (IC2E), IEEE, pp. 79-89, DOI: 10.1109/IC2E.2018.00030.

* cited by examiner

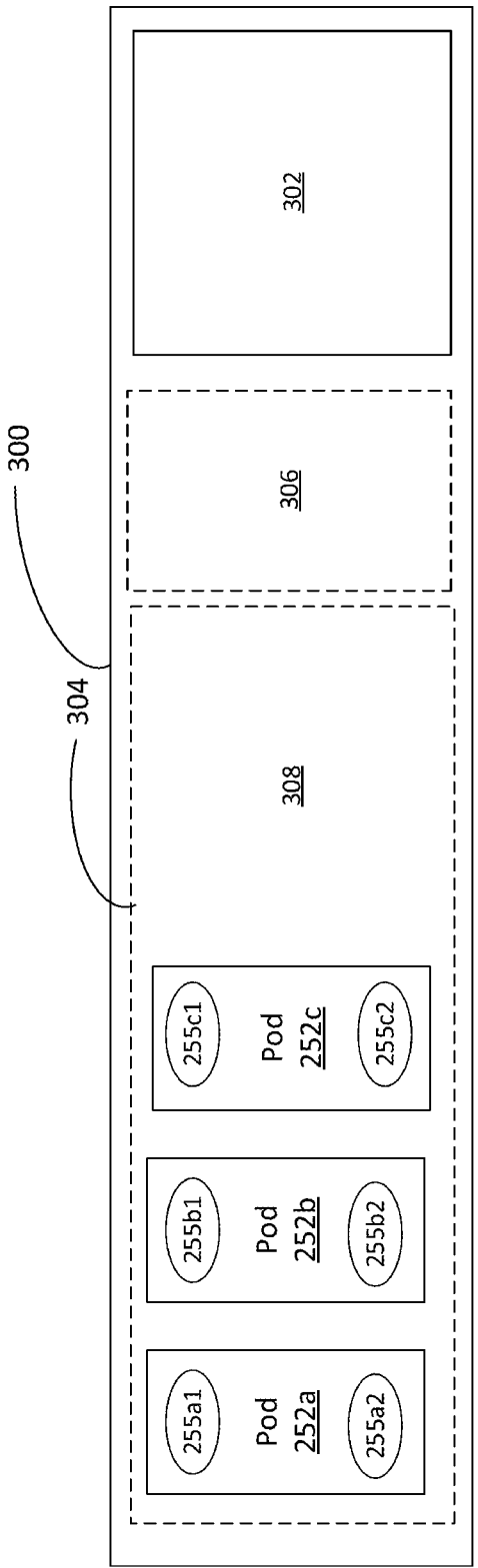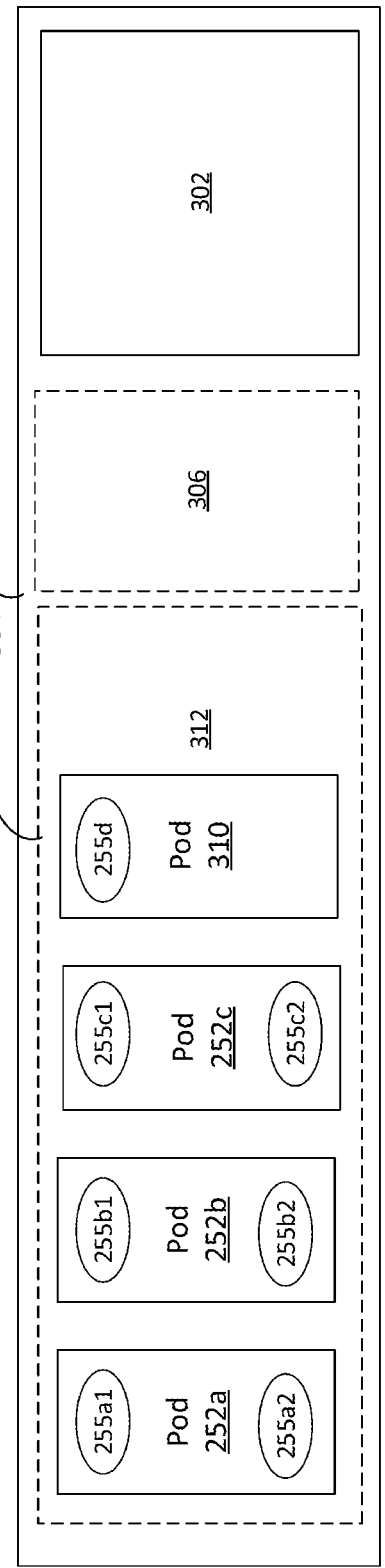

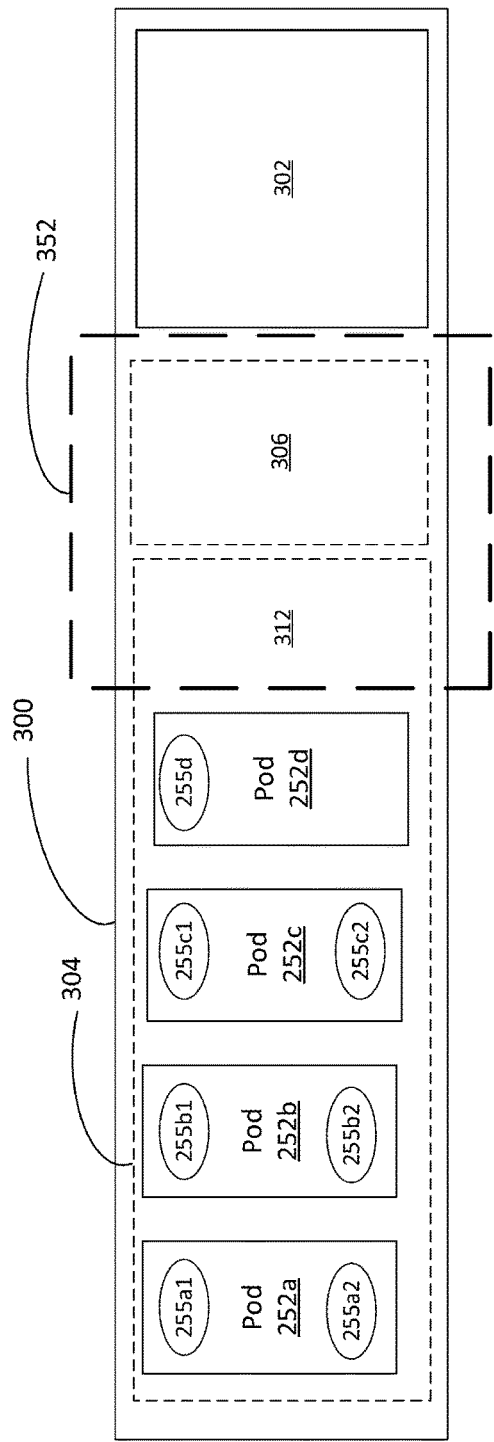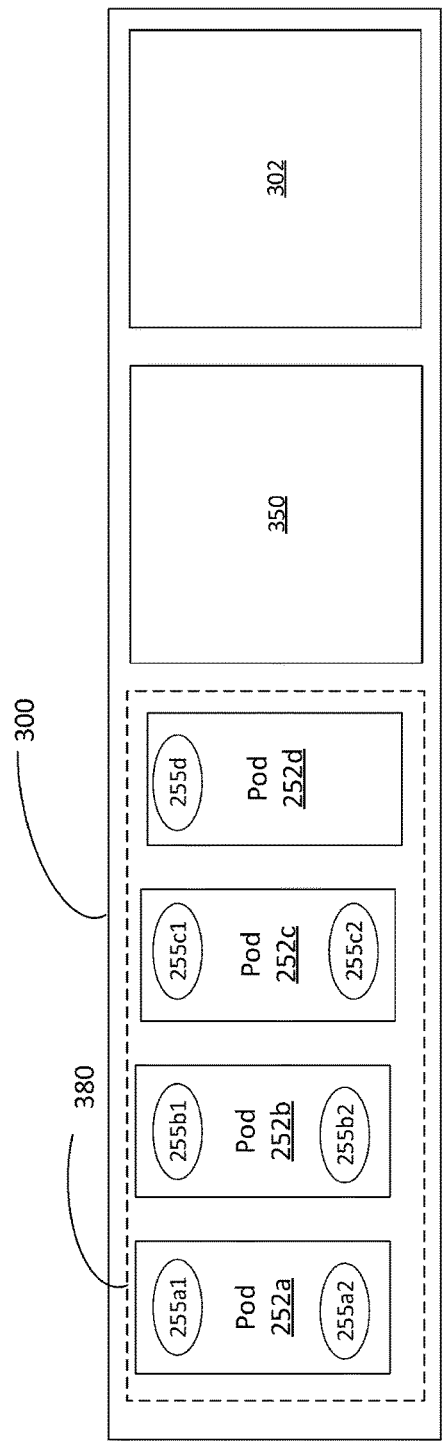

COORDINATED CONTAINER SCHEDULING FOR IMPROVED RESOURCE ALLOCATION IN VIRTUAL COMPUTING ENVIRONMENT

BACKGROUND

A containerized environment may be used to efficiently run applications on a distributed or cloud computing system. For example, various services of an application may be packaged into containers. Containers decouple applications from underlying host infrastructure and thus make deployment of applications easier in different cloud or OS environments. The containers may be grouped logically into pods. A pod, as referred to herein, is a group of one or more containers, with shared storage/network resources, and a specification for how to run the containers. A pod can be deployed on a cloud computing system, such as on a cluster of nodes that are virtual machines ("VM"). Deployment of a pod results in a pod instance and the pod runs on nodes in the cluster. The cluster may include one or more nodes that run the containers. A cluster control plane is a logical service that runs on the nodes of a cluster, which may manage the workloads and resources of the nodes according to various cloud and user defined configurations and policies. The cluster control plane includes multiple software processes and a database storing current states of the cluster. Clusters may be operated by a cloud provider, self-managed by an end user, or a hybrid combination thereof. For example, the cloud provider may have a cloud control plane that set rules and policies for all the clusters on the cloud or provides easy ways for users to perform management tasks on the clusters.

As an increasing number of applications are performed in cloud computing systems, the hardware and/or software in the cloud computing systems utilized to support the applications are configured to be dynamically scalable to meet the needs of the applications at any given time. Each virtual machine running on a host computing device is assigned a portion of memory, such as random access memory, processing capacity, and/or other resources available on that host computing device. However, some virtual machines frequently remain idle over relatively long time intervals and only need access to the respective portions of memory during short periods of time. During such idle time intervals, the resources, such as vCPUs and memory, which are allocated to those virtual machines are generally not being utilized. Such unused resource capacity results in inefficient hardware utilization.

SUMMARY

The present disclosure provides a resource allocation management, such as an enhanced oversubscription mechanism, that may utilize resource capacity among one or more virtual machines in a cloud computing system with enhanced utilization. In one example, a method for allocating resources in a computing system includes receiving, by one or more processors, a first scheduling request to initiate a first container on a first virtual machine having a set of resources, allocating, by the one or more processors, a first amount of resources from the set of resources to the first container on the first virtual machine in response to the first scheduling request, notifying, by the one or more processors, a hypervisor in a host of the first amount of resources allocated to the first container, allocating, by the one or more processors, a second amount of resources from the set of resources to a second virtual machine in the host, determining, by the one or more processors, a reduced amount of resources available in the set of resources, and notifying, by the one or more processors, the first virtual machine or a container scheduler about the reduced amount of resources of the set of resources available on the first virtual machine.

In one example, the method further includes receiving, by one or more processors, a second scheduling request to initiate a second container on the node, and allocating, by the one or more processors, a third amount of resources from the set of resources to the second container on the node in response to the second scheduling request.

In one example, the method further includes notifying, by the one or more processors, the hypervisor of the third amount of resources from the set of resources allocated to the second container, and allocating, by the one or more processors, a fourth amount of resources from the set of resources to a second virtual machine in the host.

In one example, the method further includes determining, by the one or more processors, a cumulative amount of resources used in the set of resources, and determining, by the one or more processors, if the cumulative amount of resource occupies a full amount of the set of the resources on the host, and notifying, by the one or more processors, the container scheduler from the hypervisor when the full amount of the set of the resources is consumed.

In one example, the method further includes receiving, by the one or more processors, a third scheduling request to the container scheduler for scheduling a third container on the node, and rejecting, by the one or more processors, the third scheduling request for scheduling the third container when the full amount of the set of the resources is consumed.

In one example, the container scheduler and the hypervisor are both controlled by a cloud service provider. The method further includes assigning, by the one or more processors, an upper bound of the set of resources on the node.

In one example, the method further includes notifying, by the one or more processors, the hypervisor for the upper bound of the resource set on the node. A balloon driver is utilized in the host to allocate the resource.

In one example, the method further includes checking, by the one or more processors, workload consumed in the first container, and maintaining, by the one or more processors, the workload below the first amount of resources as requested. The container scheduler and the hypervisor are configured to communicate or coordinate bidirectionally. The set of resources comprises CPU and memory available on the host.

The present disclosure further provides a computing system for allocating resources. The computing system includes one or more processors configured receive a first scheduling request to initiate a first container on a first virtual machine having a set of resources, allocate a first amount of resources from the set of resources to the first container on the first virtual machine in response to the first scheduling request, notify a hypervisor in a host of the first amount of resources allocated to the first container, allocate a second amount of resources from the set of resources to a second virtual machine in the host, determine a reduced amount of resources available in the set of resources, and notify the first virtual machine or the container scheduler about the reduced amount of resources of the set of resources available on the first virtual machine.

In some examples, a second scheduling request is received to initiate a second container on the node. A third amount of resources from the set of resources is allocated to the second container on the node in response to the second scheduling request.

In some examples, the hypervisor is notified of the third amount of resources from the set of resources allocated to the second container. A fourth amount of resources from the set of resources is allocated to a second virtual machine in the host.

In some examples, a cumulative amount of resources used in the set of resources is determined. If the cumulative amount of resource is determined to be occupied a full amount of the set of the resources on the host, the container scheduler is notified by the hypervisor when the full amount of the set of the resources is consumed. The container scheduler and the hypervisor are both controlled by a cloud service provider.

The present disclosure further provides a method for allocating resources in a computing system. The method includes coordinating, by one or more processors, between a container scheduler and a hypervisor in a host, and determining, by the one or more processors, allocation of an unused amount of resources in the host.

In some examples, the container scheduler and the hypervisor are both controlled by a cloud service provider. The method further includes notifying, by the one or more processors, the container scheduler for a reduced amount of resources after allocating the unused amount of resources.

BRIEF DESCRIPTION OF THE DRAWINGS

FIG. 3A-3D depicts a block diagram of utilization of resource allocation of a node of FIG. 2 in accordance with aspects of the disclosure.

DETAILED DESCRIPTION

The technology relates generally to efficiently managing and allocating available resources in a virtualized computing environment established in a computing system, such as a cloud computing system. In some examples, where resources of virtual machines frequently remain idle over relatively long time intervals, the unused resources may be efficiently allocated and dispatched to other virtual machines or for other uses to increase utilization of the resources of the computing system. Such allocation or reclaiming of the unused resources may be achieved by coordination between a container scheduling system and a hypervisor of the cloud computing system. The container scheduling system may include a container scheduler configured to operate or schedule containers in pods run on nodes of a cloud computing system. It is noted that the nodes referred herein are virtual machines registered with the container scheduling system scheduled to run the pods. The container scheduler may provide resource requirements, such as resource expectations of the containers, scheduled in a pod run on the node in real time to the hypervisor so that the hypervisor may be dynamically notified about the usage of the resources on the node. Once the node has unused resources, the unused resources may then be reclaimed for other uses to improve hardware utilization. Thus, coordination between the container scheduling system and the hypervisor in the cloud computing system allows the hypervisor to be dynamically notified about the usage capacity of the nodes in real time so that excess or unused resources may be dynamically rearranged or allocated so that the hardware utilization may be increased.

Figure 1:
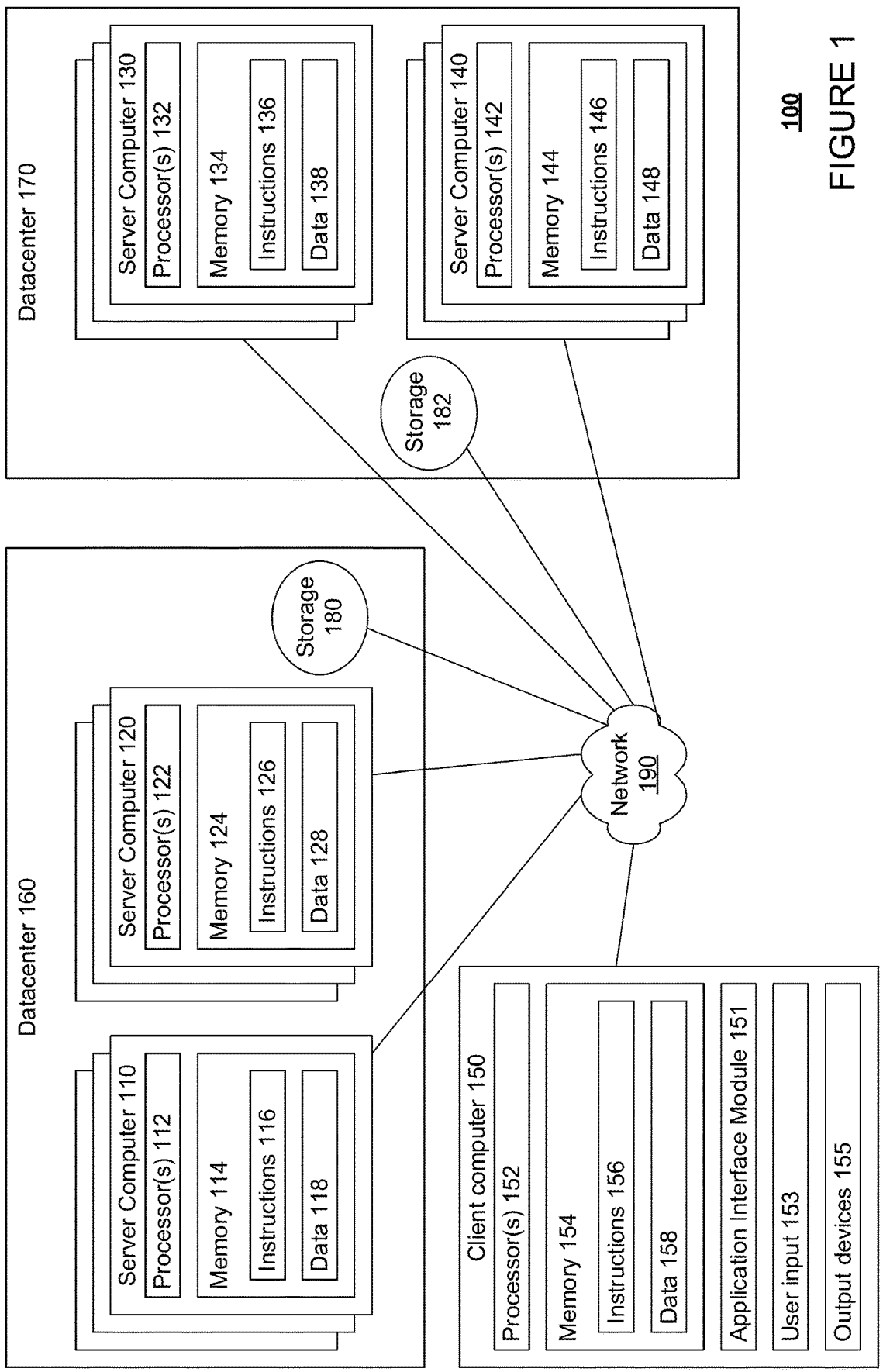
FIG. 1 depicts an example distributed system on which a cluster may be operated in accordance with aspects of the disclosure.

FIG. 1 depicts a functional diagram showing an example distributed system 100 on which clusters including multiple containers in pods may be operated. As shown, the system 100 may include a number of computing devices or computing systems, such as server computers 110, 120, 130, 140 coupled to or in electrical communication to a network 190. For instance, the server computers 110, 120, 130, 140 may be part of a cloud computing system operated by a cloud service provider. The cloud service provider may further maintain one or more storages, such as storage 180 and storage 182. Further as shown, the system 100 may include one or more client computing devices, such as a client computer 150 capable of communicating with the server computers 110, 120, 130, 140 over the network 190.

The server computers 110, 120, 130, 140 and storages 180, 182 may be maintained by the cloud service provider in one or more datacenters. For example, as shown, server computers 110, 120 and storage 180 may be located in datacenter 160, while server computers 130, 140 and storage 182 may be located in another datacenter 170. The datacenters 160, 170 and/or server computers 110, 120, 130, 140 may be positioned at a considerable distance from one another, such as in different cities, states, countries, continents, etc. Further, within the datacenters 160, 170, there may be one or more regions or zones. For example, the regions or zones may be logically divided based on any appropriate attribute.

Clusters may be operated on the distributed system 100. For example, a cluster may be implemented by one or more processors in a datacenter, such as by processors 112, 122 of server computers 110, 120 or by processors 132 and 142 of server computers 130 and 140. Further, storage systems for maintaining persistent and consistent records of states of the clusters, such as persistent disks ("PD"), may be implemented on the cloud computing system, such as in storages 180, 182, or in data 118, 128, 138, 148 of server computers 110, 120, 130, 140.

Server computers 110, 120, 130, 140 may be configured similarly. For example, as shown, the server computer 110 may contain one or more processor 112, memory 114, and other components typically present in general purpose computers. The memory 114 can store information accessible by the processors 112, including instructions 116 that can be executed by the processors 112. Memory can also include data 118 that can be retrieved, manipulated or stored by the processors 112. The memory 114 may be a type of non-transitory computer readable medium capable of storing information accessible by the processors 112, such as a hard-drive, solid state drive, tape drive, optical storage, memory card, ROM, RAM, DVD, CD-ROM, write-capable, and read-only memories. The processors 112 can be a well-known processor or other lesser-known types of processors. Alternatively, the processor 112 can be a dedicated controller such as a GPU or an ASIC, for example, a TPU.

The instructions 116 can be a set of instructions executed directly, such as computing device code, or indirectly, such as scripts, by the processors 112. In this regard, the terms "instructions," "steps" and "programs" can be used interchangeably herein. The instructions 116 can be stored in object code format for direct processing by the processors 112, or other types of computer language including scripts or collections of independent source code modules that are interpreted on demand or compiled in advance. Functions, methods, and routines of the instructions are explained in more detail in the foregoing examples and the example methods below. The instructions 116 may include any of the example features described herein.

The data 118 can be retrieved, stored or modified by the processors 112 in accordance with the instructions 116. For instance, although the system and method are not limited by a particular data structure, the data 118 can be stored in computer registers, in a relational or non-relational database as a table having a plurality of different fields and records, or as JSON, YAML, proto, or XML documents. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processors 112 and memory 114 as being within the same block, the processors 112 and memory 114 may include multiple processors and memories that may or may not be stored within the same physical housing. For example, some of the instructions 116 and data 118 can be stored on a removable CD-ROM and others within a read-only computer chip. Some or all of the instructions and data can be stored in a location physically remote from, yet still accessible by, the processors 112. Similarly, the processors 112 can include a collection of processors that may or may not operate in parallel. The server computers 110, 120, 130, 140 may each include one or more internal clocks providing timing information, which can be used for time measurement for operations and programs run by the server computers 110, 120, 130, 140.

The server computers 110, 120, 130, 140 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. In some instances, the server computers 110, 120, 130, 140 may be virtualized environments.

Server computers 110, 120, 130, 140, and client computer 150 may each be at one node of network 190 and capable of directly and indirectly communicating with other nodes of the network 190. For example, the server computers 110, 120, 130, 140 can include a web server that may be capable of communicating with client computer 150 via network 190 such that it uses the network 190 to transmit information to an application running on the client computer 150. Server computers 110, 120, 130, 140 may also be computers in one or more load balanced server farms, which may exchange information with different nodes of the network 190 for the purpose of receiving, processing and transmitting data to client computer 150. Although only a few server computers 110, 120, 130, 140, storages 180, 182, and datacenters 160, 170 are depicted in FIG. 1, it should be appreciated that a typical system can include a large number of connected server computers, a large number of storages, and/or a large number of datacenters with each being at a different node of the network 190.

The client computer 150 may also be configured similarly to server computers 110, 120, 130, 140, with processors 152, memories 154, instructions 156, and data 158. The client computer 150 may have all of the components normally used in connection with a personal computing device such as a central processing unit (CPU), memory (e.g., RAM and internal hard drives) storing data and instructions, input and/or output devices, sensors, clock, etc. Client computer 150 may comprise a full-sized personal computing device, they may alternatively comprise mobile computing devices capable of wirelessly exchanging data with a server over a network such as the Internet. For instance, client computer 150 may be a desktop or a laptop computer, or a mobile phone or a device such as a wireless-enabled PDA, a tablet PC, or a netbook that is capable of obtaining information via the Internet, or a wearable computing device, etc.

The client computer 150 may include an application interface module 151. The application interface module 151 may be used to access a service made available by one or more server computers, such as server computers 110, 120, 130, 140. The application interface module 151 may include sub-routines, data structures, object classes and other types of software components used to allow servers and clients to communicate with each other. In one aspect, the application interface module 151 may be a software module operable in conjunction with several types of operating systems known in the arts. Memory 154 may store data 158 accessed by the application interface module 151. The data 158 can also be stored on a removable medium such as a disk, tape, SD Card or CD-ROM, which can be connected to client computer 150.

Further as shown in FIG. 1, client computer 150 may include one or more user inputs 153, such as a keyboard, mouse, mechanical actuators, soft actuators, touchscreens, microphones, sensors, and/or other components. The client computer 150 may include one or more output devices 155, such as a user display, a touchscreen, one or more speakers, transducers or other audio outputs, a haptic interface or other tactile feedback that provides non-visual and non-audible information to the user. Further, although only one client computer 150 is depicted in FIG. 1, it should be appreciated that a typical system can serve a large number of client computers being at a different node of the network 190. For example, the server computers in the system 100 may run workloads for applications on a large number of client computers.

As with memory 114, storage 180, 182 can be of any type of computerized storage capable of storing information accessible by one or more of the server computers 110, 120, 130, 140, and client computer 150, such as a hard-drive, memory card, ROM, RAM, DVD, CD-ROM, write-capable, and read-only memories. In some instances, the storage 180, 182 may include one or more persistent disk ("PD"). In addition, storage 180, 182 may include a distributed storage system where data is stored on a plurality of different storage devices which may be physically located at the same or different geographic locations. Storage 180, 182 may be connected to computing devices via the network 190 as shown in FIG. 1 and/or may be directly connected to any of the server computers 110, 120, 130, 140 and client computer 150.

Server computers 110, 120, 130, 140 and client computer 150 can be capable of direct and indirect communication such as over network 190. For example, using an Internet socket, the client computer 150 can connect to a service operating on remote server computers 110, 120, 130, 140 through an Internet protocol suite. Server computers 110, 120, 130, 140 can set up listening sockets that may accept an initiating connection for sending and receiving information.

The network 190, and intervening nodes, may include various configurations and protocols including the Internet, World Wide Web, intranets, virtual private networks, wide area networks, local networks, private networks using communication protocols proprietary to one or more companies, Ethernet, WiFi (for instance, 802.81, 802.81b, g, n, or other such standards), and HTTP, and various combinations of the foregoing. Such communication may be facilitated by a device capable of transmitting data to and from other computers, such as modems (for instance, dial-up, cable or fiber optic) and wireless interfaces.

Figure 2:
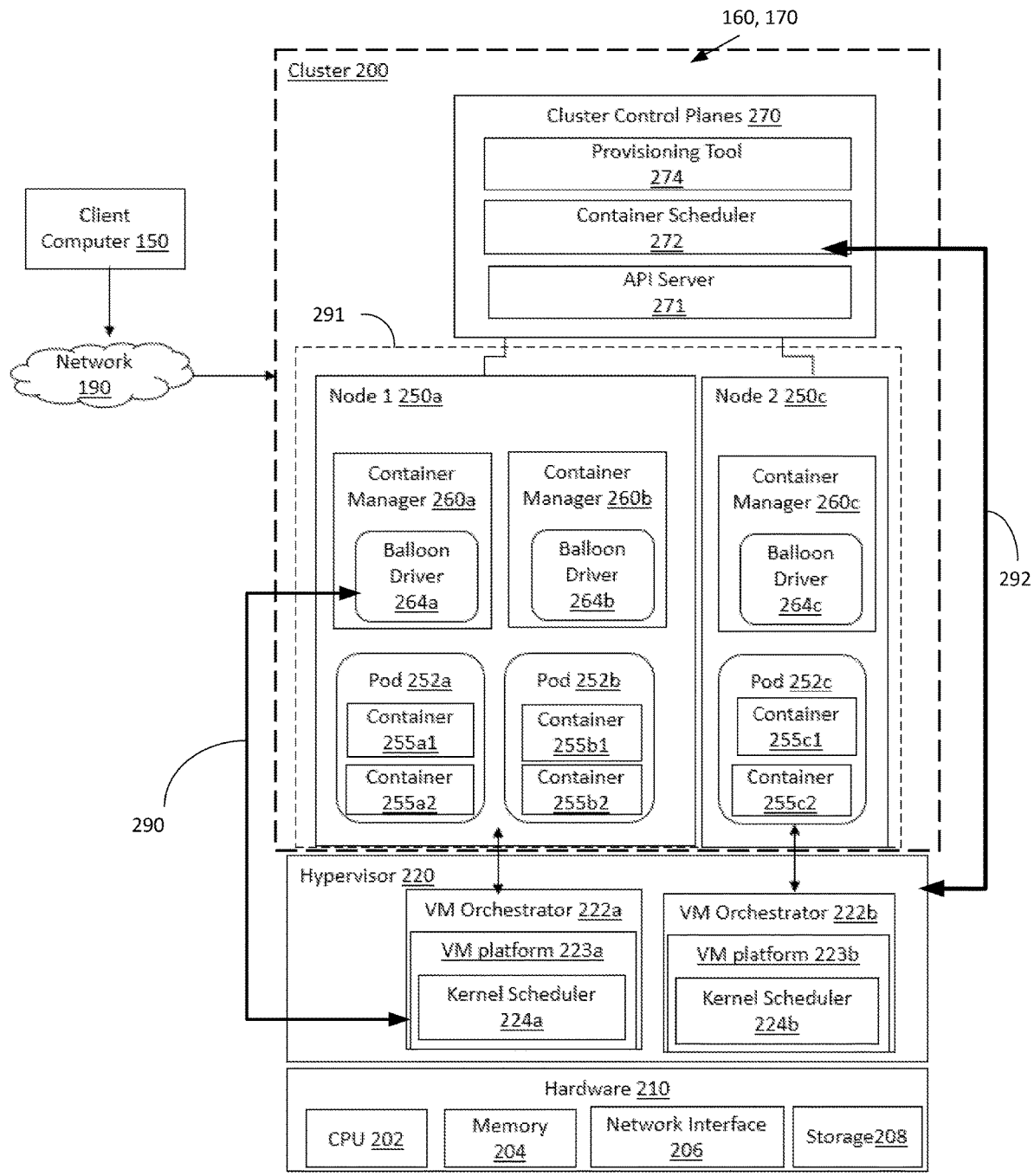
FIG. 2 depicts a cluster utilized in the example distributed system of FIG. 1 in accordance with aspects of the disclosure.

FIG. 2 is a functional diagram illustrating an example cluster 200 running on a hardware host 210 including a software layer of hypervisor 220. For example, a user, such as a developer, may design an application, and provide configuration data for the application using a client computer, such as client computer 150 of FIG. 1. The container orchestration architecture of the cluster 200 provided by a cloud computing system may be configured to package various services of the application into containers. The container orchestration architecture may be configured to allocate resources for the containers, load balance services provided by the containers, and scale the containers, such as by replication and deletion.

In one example depicted in FIG. 2, one or more nodes 250a, 250c may be configured in cluster 200. Each node 250a, 250c of the cluster 200 may be running on a physical machine or a virtual machine. In one example depicted herein, the node 250a, 250c is a virtual machine (VM) registered with the container scheduling system.

The cluster 200 may be running on a distributed system such as system 100. For example, the nodes 250a, 250c of the cluster 200 may be running on one or more processors 112, 122, 134, 144 in datacenter 160, 170 shown in FIG. 1. The nodes 250a, 250c may include containers 255a1, 255a2, 255b1, 255b2, 255c1, 255c2 of computer code and program runtimes that form part of a user application. The containers 255a1, 255a2, 255b1, 255b2, 255c1, 255c2 may be grouped into their respective pods 252a, 252b, 252c. In one embodiment, the pods 252a, 252b, 252c including the containers 255a1, 255a2, 255b1, 255b2, 255c1, 255c2 are software instances that enable virtualization at an operating system level. Thus, with containerization, the kernel of an operating system that manages a node 250a, 250c configured to provide multiple isolated user space instances. These instances appear as unique servers from the standpoint of an end user that communicates with the containers in the pods. However, from the standpoint of the operating system that manages the node 250a, 250c on which the containers execute, the containers are user processes that are scheduled and dispatched by the operating system.

As shown in FIG. 2, the container orchestration architecture may be configured as the cluster 200 including the plurality of nodes, such as node 1 250a and node 2 250b, that run on and share a common hardware platform 210 which serves as a hardware host system. The hardware platform 210 includes conventional computer hardware components, such as one or more central processing units (CPUs) 202, memory 204, one or more network interfaces 206, and a persistent storage 208. The memory 204 may be, for example, random access memory (RAM). The persistent storage 208 can be any of a variety of different types of persistent, e.g., nonvolatile, storage devices, such as a magnetic disk drive, an optical disc drive, a solid-state drive (SSD), and so forth.

A virtualization software layer, referred to hereinafter as hypervisor 220, is installed on top of hardware platform 210.

Hypervisor 220 enables the concurrent instantiation and execution of one or more nodes 250a, 250c configured in cluster 200. The nodes 250a, 250c communicated with the hypervisor 220 is facilitated by the virtual machine orchestrator 222a, 222b. Each virtual machine orchestrator 222a, 222b is assigned to and monitors a corresponding node 250a, 250b run on the cluster 200.

After instantiation, each node 250a, 250c encapsulates a physical computing machine platform that is executed under the control of hypervisor 220. Virtual devices of a node are embodied in the virtual hardware platform 223a, 223b, which is comprised of, but not limited to, one or more virtual CPUs (vCPUs), a virtual random access memory (vRAM), such as virtual memory, a virtual network interface adapter (vNIC), and virtual storage (vStorage). Thus, each node 250a, 250c is a virtual machine (VM) registered with the container scheduling system.

Further as shown, in some examples, the containers 255a1, 255a2, 255b1, 255b2, 255c1, 255c2 are further organized into one or more pods 252a, 252b, 252c. For example, as shown in FIG. 2, the nodes 250a, 250c may include the containers 255a1, 255a2, 255b1, 255b2, 255c1, 255c2, where the containers 255a1, 255a2, 255b1, 255b2 are organized into the pods 252a, 252b, respectively, in the node 1 250a, while the node 2 250c may include containers 255c1, 255c2 where the containers 255c1, 255c2 are organized into the pod 252c. In some examples, the containers 255a1, 255a2, 255b1, 255b2, 255c1, 255c2 grouped logically into the pods 252a, 252b, 252c may then be deployed on a computing system, such as on the cluster 200 of nodes 250a, 250c run on the single physical machine, such as the hardware 210. In one example, the containers 255a1, 255a2, 255b1, 255b2, 255c1, 255c2 may be used to run more than one instance of the computing system on the single physical machine, such as the hardware 210, wherein the VM and physical machine share a common hardware architecture.

The use of VMs is driven by the desire to consolidate many less-capable physical machines onto a single more-capable physical machine, generally to reduce operation costs by providing to virtual resources the illusion of more available resources than there are physical resources, which is known as over-subscription. For example, a physical machine containing a single physical CPU may host several containers 255a1, 255a2, 255b1, 255b2, 255c1, 255c2, each of which may be allocated with a virtual CPU. The clock cycles of the physical CPU 202, during which the CPU executes some number of instructions, are divided between the virtual CPUs such that the sum of all clock cycles consumed by the set of virtual CPUs is less than or equal to the clock cycle rate of the physical CPU 202. Thus, the time slices of the physical device 202 are divided and over-subscription is achieved through having more than one virtual device per physical device 202.

The containers 255a1, 255a2, 255b1, 255b2, 255c1, 255c2 and pods 252a, 252b, 252c grouping the containers 255a1, 255a2, 255b1, 255b2, 255c1, 255c2 may have various workloads running thereon, for example the workloads may serve content for a website or processes of an application. The pods 252a, 252b, 252c may belong to "services," which expose the pod to network traffic from users of the workloads, such as users of an application or visitors of a website. Each pod 252a, 252b, 252c is managed by a respective container managers 260a, 261a, 260b. The container managers 260a, 261a, 260b may be configured to start, stop, and/or maintain the containers and/or the pods based on the instructions from the nodes. The container managers 260a, 261a, 260b may further include one or more load balancers that may be configured to distribute traffic, such as, for example, requests from the services, to the workloads running on cluster 200. For example, the container managers 260a, 260b, 260c may manage the traffic distributed between the pods 252a, 252b, 252c in the nodes 250a, 250c of cluster 200. In some examples, the container managers 260a, 261a, 260b are configured to schedule and dispatch multiple processes that execute and access computer resources, such as vCPUs or virtual memory, concurrently using a variety of algorithms. In some examples, the container managers 260a, 261a, 260b may dispatch processes to certain vCPUs that are less busy than other vCPUs.

In one example, the container managers 260a, 260b 260c may include a balloon driver 264a, 264b, 264c. The balloon driver 264a, 264b, 264c may provide a resource allocation technique to facilitate the resource allocation. For example, the balloon driver 264a, 264b, 264c receives a command from the hypervisor 220 about the resource expectation and the balloon driver thein inflates or deflates available resources within the VM to meet the target expectation. The balloon driver 264a, 264b, 264c may be in communication with kernel schedulers 224a, 224b to adjust available resources, such as available memory or CPUs for use by the containers.

The balloon driver 264a, 264b, 264c may remain in an idle state until triggered by a timer event or by a command from the hypervisor 220 and/or the VM orchestrator 222a, 222b. After executing, the balloon driver 264a, 264b, 264c may return back into an idle state until triggered again by another timer event or by another commend from the hypervisor 220 and/or the VM orchestrator 222a, 222b. The balloon driver by a command from the hypervisor 220 and/or the VM orchestrator 222a, 222b obtains information from kernel scheduler 224a, 224b to adjust the resources, such as the number of vCPUs or memory that are available for use by the nodes 250a, 250c. The balloon driver 264a, 264b, 264c is configured to maintain a predetermined amount of resources, such as a predetermined number of CPUs or memory activated for the nodes 250a, 250c and for the containers in the pod.

The kernel scheduler 224a, 224b is a component of hypervisor 220. Kernel scheduler 224a, 224b is responsible for allocating physical CPU 202 among the various processes running on the cluster 200 at a given time, wherein a process, as used here, is an executing computer program. For example, the kernel scheduler 224a, 224b may determine what processes should be run on CPU 202 or memory 204, the order in which such processes shall run, and so on.

In addition to managing access to physical CPU 202, the kernel scheduler 224a, 224b, in embodiments described herein, is configured to determine a target vCPU size, which is a target number of vCPUs that a particular container or pod could use at a given point in time. This target vCPU size provisioned by the kernel scheduler 224a, 224b, is in communication to the balloon driver 264a, 264b, 264c, as shown by the directional line 290. The balloon driver 264a, 264b, 264c then may then utilize the information and/or recommendation from the kernel scheduler 224a, 224b to adjust the available resources run on the containers and/or pods.

For example, if the vCPUs that the containers run on are not fully utilized, the balloon driver 264a, 264b, 264c may decrease the resource, such as the number of vCPUs or memory, available for use by the containers by communications or coordination between a container scheduler or a node and a hypervisor. The kernel scheduler 224a, 224b, as instructed by the hypervisor 220, may then reclaim and control the unused resource for other utilization.

A cluster control plane 270 may be utilized to manage the nodes 250a, 250b in cluster 200. For example, as shown, the cluster control plane 270 may include a provisioning tool 274, a container scheduler 272, and an API server 440, etc. It is noted that cluster 200 may include a plurality of cluster control planes for different processes. For example, cluster 200 may include a plurality of API servers and a plurality of container schedulers for different process proposes.

The cluster control plane 270 may be configured to perform administrative tasks for cluster 200, including managing cluster 200, managing nodes running within cluster 200, provisioning nodes, migrating nodes from one cluster to another cluster, and load balancing between clusters.

In one or more embodiments, the cluster control plane 270 is configured to perform resource management for the containers 255a1, 255a2, 255b1, 255b2, 255c1, 255c2 in a virtualized environment. The cluster control plane 270 is also configured to deploy, update, or remove instances of containers 255a1, 255a2, 255b1, 255b2, 255c1, 255c2 on each of the nodes. By implementing containers on nodes, such as virtual machines, response time may be improved as booting a container is generally faster than booting a VM. Containers also have smaller footprints than VMs, thus improving density. Storage space can also be saved.

In one or more embodiments, the cluster control plane 270 may have multiple components configured to perform resource management for containers 255a1, 255a2, 255b1, 255b2, 255c1, 255c2 in a virtualized environment. The cluster control plane 270 may create a virtual infrastructure by instantiating a packaged group (or pool 291) of a plurality of nodes 250a, 250b, such as virtual machines (VMs), installed therein. The cluster control plane 270 may deploy, update, or remove instances of containers on each of the VMs.

In one example, the cluster control plane 270 may further include at least an API server 271, a container scheduler 272 and a provisional tool 274 configured to perform different tasks. It is noted that other components not shown in FIG. 2 may also be included in the cluster control plane 270 to facilitate the operation and arrangement of the containers in the nodes.

In one example, the API server 271 may be configured to receive requests, such as incoming API requests from a user application or from workloads running on the nodes 250a, 250c, and manage the nodes 250a, 250c to run workloads for handling these API requests. The API server 271 may be configured to route the incoming requests to the appropriate server for proper work arrangement.

The API server 271 may be configured to provide the intents and statuses of cluster 200 to the container scheduler 272. Thus, the container scheduler 272 may be configured to track and arrange resources used on each container in the pod to ensure that workload is not scheduled in excess of available resources, based on the information provided from the API server 271. For this purpose, the container scheduler 272 may be provided with the resource requirements, resource availability, and other user-provided constraints and policy directives such as quality-of-service, affinity/anti-affinity requirements, data locality, and so on. As such, the role of the container scheduler 272 may be to match resource supply to workload demand.

The API server 271 may be configured to communicate with the nodes 250a, 250b. For example, the API server 271 may be configured to ensure that the configuration data matches that of containers in the nodes 250a, 250b, such as containers 255*a*1, 255*a*2, 255*b*1, 255*b*2, 255*c*1, 255*c*2. For example, the API server 271 may be configured to communicate with container managers 260*a*, 260*b*. The container managers 260*a*, 260*b* may be configured to start, stop, and/or maintain the containers based on the instructions from the node 250*a*, 250*c*.

A provisioning tool 274 may also be utilized to manage the provisioning, migration, and/or termination of containers or virtual machines across the virtualization infrastructure. The provisioning tool 274 may track virtual machine usage statistics across the virtualization infrastructure to identify maintenance issues to perform. For example, the provisioning tool 274 may utilize the statistics to determine that a virtual machine, such as a node in the cluster, may beneficially be migrated from one data center to another data center. This decision may be based on access statistics associated with client access. Access statistics can include historic, recent, and trending locations of accesses. Some examples of access statistics include total accesses per region per timeframe, traffic change per region per timeframe, and other such statistics.

The container scheduler 272 in the cluster control plane 270 may manage virtualized resources such that at any given time a specified quantity of free CPU and memory resources are available within the pool 291 of nodes 250*a*, 250*c*. When a user requests for a container, the container scheduler 272 may place the requested container on the nodes 250*a*, 250*c* within the designated pool 291 with enough resources, such as CPU, memory, based on the container request specified by the user. The container scheduler 272 may intelligently allocate available resources across the pool 291 of nodes 250*a*, 250*c* to make an initial placement of the container within the pool of nodes. Thus, the container scheduler 272 may be configured to identify the current CPU and memory available on each node 250*a*, 250*c* in the pool 291 to identify a VM for initial placement of the container. The container scheduler 272, instance scheduled on the node 250*a*, 250*b* and the node 250*a*, 250*b* may be collectively referred as a container scheduling system. After initial implementation is completed for the containers, then the container scheduler 272, the instance scheduled on the node 250*a*, 250*b* or the node 250*a*, 250*b* may start to dynamically communicate or coordinate with the hypervisor 202 to notify the hypervisor for the information for the consumed resource as well as the unused available resource in the nodes. The unused available resources may then be further reclaimed or utilized for other purposes, which will be further described below with reference to FIGS. 3A-3D and 4.

In one example, the container scheduler 272 may also be utilized to perform tasks, such as determining the container instance into which to launch the application, and cause the instance running in the determined container to launch the application. The container scheduler 272 manages the scheduling of containers in cluster 200, determining which containers are run on the node at certain times. In one example, a single container may be run at a time or alternatively, multiple containers may be run concurrently based on the numbers of the physical processors and/or processor cores are utilized in cluster 200. Each container may include one or more processors that perform the workload for the container.

In some examples, the container scheduler 272 may schedule pods based on the virtual storage volumes used by a particular container. The container scheduler 272 may check if the container is using any consistent volumes or has unused resources idle without utilization. If there is such a predictable or unused resource, the container scheduler 272 may identify such resources and notify the hypervisor 220, as shown in the directional arrow 292, so that the hypervisor may reclaim or use such resources for different arrangements, such as creating another virtual machine. For example, the container scheduler 272 may be in communication with the containers so that the metrics of the instance running on the containers, such as processor utilization and the memory utilization data, may be reported to the container scheduler 272 to facilitate better utilization of the unused resources.

In one example, the container scheduler 272 and/or the instance scheduled on the nodes 250*a*, 250*c* may coordinate with the hypervisor 220 bidirectionally so that the container schedules 272 and/or the nodes 250*a*, 250*c* may dynamically report the real resource usage to the hypervisor 202 so that hypervisor 202 may reclaim and reuse such unused resources for other arrangements when available.

As described above, over-subscription occurs when multiplexing more virtual resources than there are physical resources, such as more than one virtual device per physical device. Conventionally, an operator of the virtualized computing environment, such as a cloud service provider, may provide access to physical resources to its users, such as an end user or a customer, and allow the users to execute their programs using the physical resources of the service provider. For example, each cluster 200 includes the hypervisor 220, or other virtualization components, that host one or more nodes, such as virtual machines. Each container in the node may be owned by a particular user and can execute a service or application using the physical resources of the virtualized computing environment. The user can request, access and manage the virtual machine assigned to them via API server 271, the container scheduler 272 and other management tools. Oversubscription generally carries the risk when the two virtual machines both simultaneously attempt to use the entirety of the available memory presented, e.g., made visible to the virtual machines, while insufficient memory from the hardware 210 is available to support their operations.

Thus, by coordination between the container scheduler 272 and the nodes 250*a*, 250*b* and the hypervisor 220, the container scheduler 272 then monitors the real usage of the resources, such as CPUs and/or memory, in each container so that the hypervisor 220 may have the real time information regarding the availability of the unused resources. Thus, when the available resource from containers in the node is running below the resources actually allocated for the node, the container scheduler 272 or the nodes may communicate and coordinate such availability with the hypervisor 220 so that the hypervisor 220 may determine whether to suggest adding other resources or allocate the new incoming request to other available resources, such as other nodes or other secondary resources, so as to prevent running into the risk of oversubscription. In this regard, the hypervisor may temporarily utilize those spare resources for other use, such as to schedule another VM. Thus, the hypervisor can temporarily provide an illusion to the node 250*a*, 250*b* of more resources than there are available physically so that the unused resources in the node 250*a*, 250*b* may be reused as needed.

In contrast, in a conventional bin packing process configured to pack containers of different sizes into an unit with a predetermined capacity of physical resources, the conventional bin packing process may merely utilize the entire physical resources in the unit, but not more so that any underutilization of a VM inevitably leads to unused hardware resources. By coordination between the container scheduler 272 and the nodes 250*a*, 250*b* and the hypervisor 220, the container scheduler 272 then monitors the real usage of the resources in each container so that the hypervisor 220 may have the real time information regarding the availability of the unused resources. Thus, the unused resource may be further utilized as needed.

In some examples, further requirements/constraints may be set when setting up workloads to a node to prevent running the risk of oversubscription. For example, each workload scheduled on the nodes is required to set the resource requests with an upper bound. Accordingly, the user is only allowed to dictate the workload under certain resource capacity without extending beyond the upper bound. Thus, the workloads are not permitted to consume resources beyond the request, such as the upper bound, set for each node. Accordingly, a workload assigned to the node is required to specify the resource limit, such as numbers of the vCPUs and memory requirements, to be utilized on the node. Once the workload is scheduled or deleted, the container scheduler 272 may instantly communicate and transmit the real current usage to the hypervisor 220 so that the hypervisor 220 may shrink the resource limit to the upper bound and reclaim excess resources via the balloon driver 264a, 264b, 264c for other uses to improve hardware utilization. For example, when a workload requesting a resource of 5.5 vCPU and 32 GB memory running on an instance on the node where the instance has a resource of 8 vCPU and 64 GB allocated, by utilizing the bidirectionally communication and coordination between the hypervisor 220 and the container scheduler 272 and/or the nodes, the unused resource of 2.5 vCPU and 32 GB memory may be safely reclaimed by the hypervisor 220 for other arrangements, such as creating an additional virtual machine, to improve hardware utilization.

After the excess resource is reclaimed by the hypervisor 220, a reduced resource value or reduced available resource baseline may be set and the hypervisor 220 may then notify the container scheduler 272 or the node with the reduced effective resources/capacity. Thus, the container scheduler 272 or the node is aware that the available capacity becomes constrained and the impacted node may be updated with the new reduced capacity. Thus, the new incoming workload may be set or scheduled under the new reduced capacity. Thus, by utilizing the communication and coordination bidirectionally between the hypervisor 220 and the container scheduler 272 and/or the nodes, the real usage of the hardware resources may be dynamically adjusted with minimum risk of running into resource contention due to oversubscription.

FIGS. 3A-3D depict a block diagram of resource allocation in virtual machines of FIG. 2 in accordance with aspects of the disclosure. The resource allocation, such as vCPU and virtual memory allocation, may be performed by utilizing the balloon driver 264a, 264b, 264c configured in the nodes 250a, 250b. As shown in FIG. 3A, each computing system may be assigned with a resource capacity 300. An instance running on the node may have a node capacity 304. Each workload and/or instance scaled in containers 255a1, 255a2, 255b1, 255b2, 255c1, 255c2 in each pod 252a, 252b, 252c may consume certain amount of the capacity set in the node capacity 304. In the example depicted in FIG. 3A, some unused capacity 308 is available in the capacity 304 scaled in the node as well as some unused capacity 306 from the host. A generic instance 302 may be set on the host.

When an additional pod 310 with a container 225d is scheduled in the node by the container scheduler 272, as depicted in FIG. 3B, additional capacity may be consumed in the node capacity 304, shrinking the available capacity from the unused capacity 308 to a diminished available capacity 312.

Thus, when the available resources in the node capacity 304 is changed, the container scheduler 272 may notify such capacity change to the hypervisor 220. The balloon driver may then be utilized to reserve such resource, such as the diminished available capacity 312. In the example depicted in FIG. 3C, after the additional pod 310 with the container 255d is scheduled in the node 304, the unconsumed capacity, such as current available resource capacity, may include the diminished available capacity 312 and the unused capacity 306, as indicated by the dotted line 352.

The hypervisor 220 may then reclaim the diminished available capacity 312 for other uses. For example, in the embodiment depicted in FIG. 3D, the hypervisor 220 may utilize the diminished available capacity 312 as well as the unused capacity 306 in the host, in combination, to schedule another generic instance 350, such as another virtual machine, in the computing system. The capacity available in the node is then shrunk from the larger capacity 304 to the reduced effective capacity 380 with part of the capacity 312 reallocated for other uses, such as for the generic instance 350 to create another virtual machine.

Figure 4:
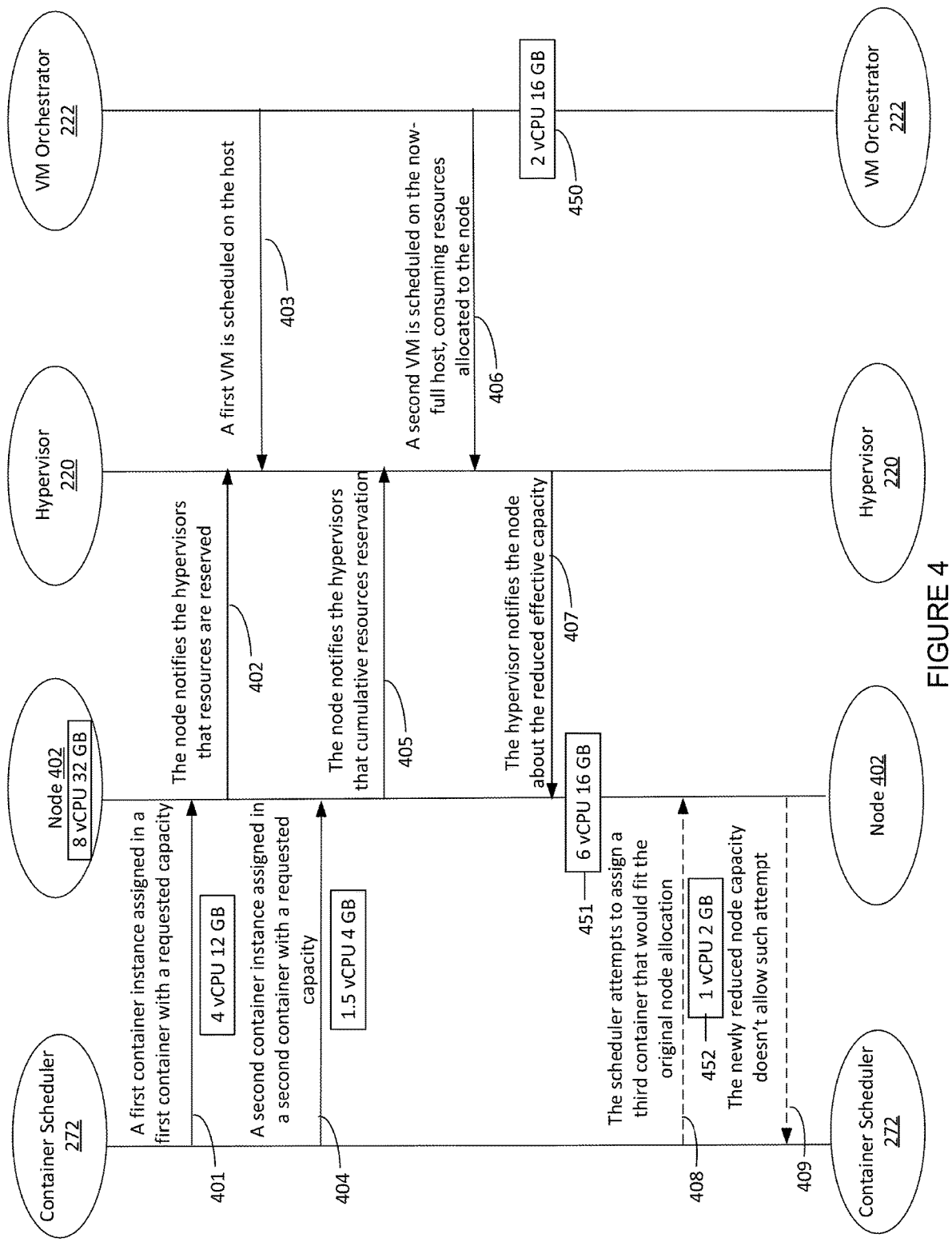
FIG. 4 depicts a timing diagram illustrating an example coordination between a hypervisor and a container scheduler in a computing system in accordance with aspects of the disclosure.

FIG. 4 depicts a timing diagram illustrating an example communication and coordination between the hypervisor 220 and the container scheduler 272 and/or the nodes for resource allocation. In this example, a node 402 having a resource of 8 vCPUs with memory of 32 GB is scheduled. When a first container is initiated on the node, as shown in the communication path 401, the first container may have a capacity request of a first container instance requesting a capacity of 4 vCPUs and 12 GB memory. After the first container with the requested capacity of the first container instance is assigned on the node 402, the node 402 may notify the hypervisor 220 regarding the reserved or used capacity by the first container instance for the first container, as shown in the communication path 402. The hypervisor 220 may then be notified the amount of resource change available in the node and/or in the host. After the notification is completed, the VM orchestrator 222 then utilizes the unused resource to schedule another VS, such as a first VM, and provides feedback to the hypervisor 220 about the capacity used by the first VM, as shown in the communication path 403. It is noted that the first VM scheduled herein may be any suitable types of VMs, such as a VM running an operating system, a VM registered with a container scheduling system (or called a node), or the like.

When a second container is further initiated with a second container instance, as shown in the communication path 404, the second container instance may request a capacity of 1.5 vCPU and 4 GB memory on the node. After the second container with the requested capacity of the second container instance is assigned on the node 402, the node 402 notifies the hypervisor 220 regarding cumulative resources, such as a total capacity of 5.5 vCPU and memory of 16 GB memory consumed reserved both for the first and the second containers, as shown in the communication path 405. The hypervisor 220 may be notified about the amount of resource change in the node and/or in the host. After the notification is completed, the VM orchestrator 222 may utilize or reclaim the unused resource to schedule yet another VM, such as a second VM when needed. As described above, the second VM scheduled herein may be any suitable types of VMs, such as a VM running an operating system, a VM registered with a container scheduling system (or called a node), or the like.

After the second VM is scheduled, the updated capacity is feedbacked to the hypervisor 220, notifying that the capacity of the resource has been fully reclaimed and consumed with no spare resource, as shown in the communication path 406, based on the used resource of the first and the second VMs. In this example, a capacity of 2 vCPU and 16 GB memory, as shown in the box 450, has been claimed and consumed for scheduling the first and the second VMs, leaving minimum or no useable resources available on the node 402. Thus, the hypervisor 220 may then be notified that the spared capacity of 2 vCPU and 16 GB memory has been consumed and, at this time point, and no additional spared or unused resources are available.

Subsequently, the hypervisor 220 may then notify the node 402 and/or directly the container scheduler 272, or collectively called as the container scheduling system, for the new useable capacity baseline, such as the reduced effective capacity, as shown in the communication path 407. The new useable capacity baseline, such as the reduced effective capacity of the resource capacity of 6 CPU and memory of 16 GB, as shown in the box 451, is now set on the node 402.

Thus, after the communication and coordination between the container scheduler 272 and the hypervisor 220, the container scheduler 272 and/or the node, or collectively called as the container scheduling system, then be notified with the reduced effective capacity of 6 CPU and 16 GB memory, as shown in the box 451, from which the first container and the second container already consume a total capacity of 5.5 vCPU and 16 GB memory. Thus, when a further attempt is executed by the container scheduler 272 to schedule a third container requiring a resource of 1 vCPU and 2 GB memory, as shown in the dotted communication path 408, such attempt may then be rejected as the reduced effective capacity doesn't allow additional scheduling of the containers, as shown in the dotted communication path 409, as no spared capacity is available. The scheduling of the new container will be required to search another available instance or another node.

Thus, by utilizing the coordination and communication between the container scheduler and/or the nodes and the hypervisor, the unused resources may be reclaimed dynamically by the hypervisor to other uses. The container scheduler may also be instantly notified for such resource allocation so as to reduce the likelihood of real oversubscription when additional containers are attempted to be scheduled on the VMs requesting resources more than the physical hardware could provide.

Figure 5:
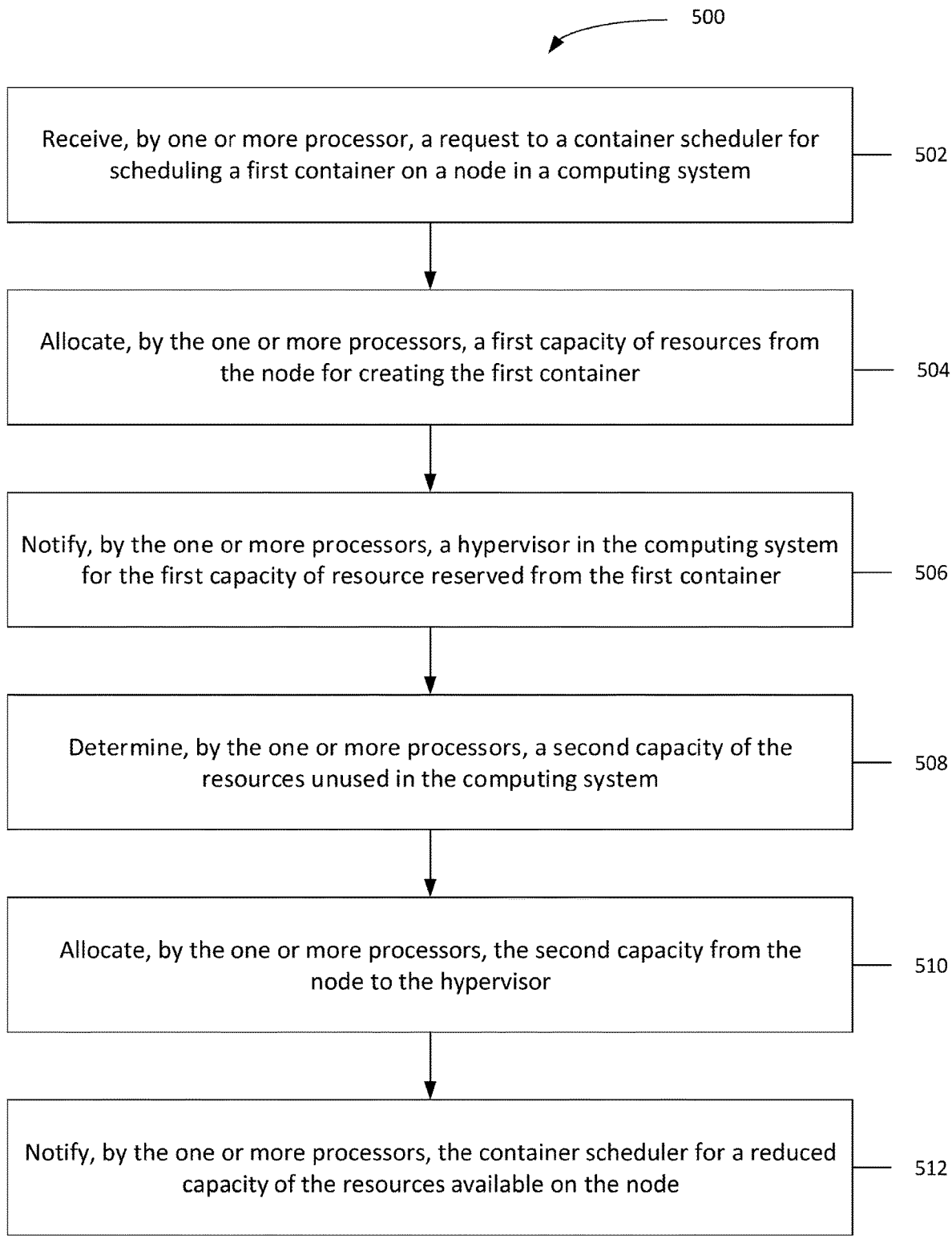
FIG. 5 is an example flow diagram in accordance with aspects of the disclosure.

FIG. 5 depicts an example flow diagram 500 that may be performed by one or more processors, such as one or more processors 112, 122. For example, processors 112, 122 may receive data and commands Based on the received data or commands, the processors 112, 122 may make various determinations as shown in the flow diagram 500. The flow diagram 500 depicts one example of coordination between the hypervisor 220 and the container scheduler 272 and/or the nodes performed by the one or more processors 112, 122.

Referring to FIG. 5, at block 502, a request to schedule a first container on a node, such as a first VM, in a computing system is received by a container scheduler. The request may include a desired amount of resources, such as a first amount of resources, to be used to schedule the first container on the node.

At block 504, the first amount of resources in the node is allocated to create the first container.

At block 506, after the first container is scheduled, the information of the first amount of resources for the first container is notified and transmitted to the hypervisor.

At block 508, the hypervisor may then determine the unused or remaining amount of resources remained in the node.

At block 510, the unused resource may then be allocated and reclaimed by the hypervisor for other arrangement or purposes, such as creating another virtual machine, such as a second VM. It is noted that the second VM scheduled herein may be any suitable types of VMs, such as a VM running an operating system, a VM registered with a container scheduling system (or called a node), or the like.

At block 512, after the unused resource is reclaimed for other uses, such as creating another VM, the hypervisor may then communicate and coordinate with the container scheduler and/or the node for the reduced effective capacity or reduced affective available resources on the instance on the node.

The technology is advantageous because it provides coordination and communications between the container scheduler and the hypervisor in the cluster on the host so that the real usage of the resources in the node may be dynamically allocated and dispatched for better resource management and hardware utilization. Furthermore, in order to enable the coordination between the container scheduler, instance in the node and the hypervisor, the container scheduler, instance in the node and the hypervisor may be configured to be both owned or controlled by the operator of the virtualized computing environment, such as a cloud service provider. Thus, the operator may monitor the usage of the resources and execute proper allocation of the resources to enhance utilization and oversubscription management.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for allocating resources in a computing system, comprising:
  receiving, by one or more processors, a first scheduling request to initiate a first container on a first virtual machine having a set of resources;
  allocating, by the one or more processors, a first amount of resources from the set of resources to the first container on the first virtual machine in response to the first scheduling request;
  notifying, by the one or more processors, a hypervisor in a host of the first amount of resources allocated to the first container;
  allocating, by the one or more processors, a second amount of resources from the set of resources to a second virtual machine in the host;
  determining, by the one or more processors, if a full amount of the set of the resources on the host is consumed or an unused amount of resources is available in the set of resources on the host, wherein the unused amount of resources is monitored in real time by a container scheduler;

in response to the unused amount of resources being available in the set of resources on the host, notifying the hypervisor in real time by a container scheduler about the unused amount of resources of the set of resources available on the first virtual machine, wherein the unused amount of resources is dynamically rearranged or allocated by the hypervisor; and in response to the full amount of the set of the resources on the host being consumed, notifying, by the one or more processors, the container scheduler when the full amount of the set of resources on the host is consumed.

2. The method of claim 1, further comprising:

receiving, by the one or more processors, a second scheduling request to initiate a second container on the first virtual machine; and allocating, by the one or more processors, a third amount of resources from the set of resources to the second container on the first virtual machine in response to the second scheduling request.

3. The method of claim 2, further comprising:

notifying, by the one or more processors, the hypervisor of the third amount of resources from the set of resources allocated to the second container; and allocating, by the one or more processors, a fourth amount of resources from the set of resources to a third virtual machine in the host.

4. The method of claim 1, wherein the first virtual machine is a virtual machine registered with a container scheduling system.

5. The method of claim 1, wherein the container scheduler and the hypervisor are both controlled by a cloud service provider.

6. The method of claim 1, wherein receiving the first scheduling request further comprises:

assigning, by the one or more processors, an upper bound of the set of resources on the first virtual machine; and notifying, by the one or more processors, the hypervisor about the upper bound of the set of resources on the first virtual machine.

7. The method of claim 1, wherein notifying the first virtual machine or the container scheduler about the unused amount of resources further comprises:

notifying the first virtual machine or the container scheduler by the hypervisor about the unused amount of resources.

8. The method of claim 1, wherein allocating the first amount of resources further comprises:

utilizing a balloon driver to allocate the resources.

9. The method of claim 1, wherein receiving the first scheduling request for scheduling the first container further comprises:

checking, by the one or more processors, workload consumed in the first container; and maintaining, by the one or more processors, the workload below the first amount of resources as requested.

10. The method of claim 1, wherein the container scheduler and the hypervisor are configured to communicate bidirectionally.

11. The method of claim 1, wherein the first container is initiated in a pod deployed in the first virtual machine.

12. A computing system for allocating resources, comprising:

one or more processors configured to:

receive a first scheduling request to initiate a first container on a first virtual machine having a set of resources;

allocate a first amount of resources from the set of resources to the first container on the first virtual machine in response to the first scheduling request;

notify a hypervisor in a host of the first amount of resources allocated to the first container;

allocate a second amount of resources from the set of resources to a second virtual machine in the host;

determine if a full amount of the set of the resources on the host is consumed or an unused amount of resources is available in the set of resources on the host, wherein the unused amount of resources is monitored in real time by a container scheduler;

in response to the unused amount of resources being available in the set of resource on the host, notify the hypervisor in real time by the container scheduler about the unused amount of resources of the set of resources available on the first virtual machine, wherein the unused amount of resources is dynamically rearranged or allocated by the hypervisor; and in response to the full amount of the set of the resources on the host being consumed, notify the container scheduler by the hypervisor when the full amount of the set of resources on the host is consumed.

13. The computing system of claim 12, wherein the one or more processors are further configured to:

receive a second scheduling request to initiate a second container on the first virtual machine; and allocate a third amount of resources from the set of resources to the second container on the first virtual machine in response to the second scheduling request.

14. The computing system of claim 13, wherein the one or more processors are further configured to:

notify the hypervisor of the third amount of resources from the set of resources allocated to the second container; and allocate a fourth amount of resources from the set of resources to a third virtual machine in the host.

15. The computing system of claim 12, wherein the container scheduler and the hypervisor are both controlled by a cloud service provider.

* * * * *